United States Patent [19]
Tanaka et al.

[11] Patent Number: 6,150,953
[45] Date of Patent: Nov. 21, 2000

[54] COMMUNICATION CONTROL METHOD, COMMUNICATION SYSTEM AND ELECTRONIC APPARATUS USING THE SAME

[75] Inventors: Tomoko Tanaka, Kanagawa; Harumi Kawamura; Makoto Sato, both of Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/864,897

[22] Filed: May 29, 1997

[30] Foreign Application Priority Data

Jun. 4, 1996 [JP] Japan .................................. 8-141626

[51] Int. Cl.$^7$ ..................................................... G08B 5/22
[52] U.S. Cl. ............................. 340/825.37; 340/825.37; 340/825.06; 340/825.07; 340/825.52; 340/825.69
[58] Field of Search ......................... 340/825.37, 825.06, 340/825.07, 825.52, 825.69; 348/5; 386/68, 69

[56] References Cited

U.S. PATENT DOCUMENTS

| | | | |
|---|---|---|---|
| 4,855,730 | 8/1989 | Venners et al. | 340/825.24 |
| 5,251,074 | 10/1993 | Hamma et al. | 386/69 |
| 5,485,149 | 1/1996 | Takiguchi et al. | 340/825.69 |
| 5,488,357 | 1/1996 | Sato et al. | 340/825.69 |
| 5,488,409 | 1/1996 | Yuen et al. | 348/5 |
| 5,689,244 | 11/1997 | Iijima et al. | 340/825.07 |
| 5,760,698 | 6/1998 | Iijima et al. | 340/825.07 |

FOREIGN PATENT DOCUMENTS

| | | |
|---|---|---|
| 0 485 997 | 5/1992 | European Pat. Off. . |
| WO 93 21715 | 10/1993 | WIPO . |
| WO94 03017 | 2/1994 | WIPO . |

OTHER PUBLICATIONS

"DCBS Print Function in DOS LAN Requester" IBM Technical Disclosure Bulletin, US, IBM Corp. New York, vol. 36, No. 9A, pp. 569–578, XP000396169.

Teener M: "A Bus on a Diet—the Serial Bus Alternative. An Introduction to the P1394 High Performance Serial Bus" Proceedings of the Computer Society International Conference (COMPCON) Spring, US, Los Alamitos, IEEE Comp-.Soc.Press, vol. Conf. 37, pp. 316–321, XP000340753.

*Primary Examiner*—Brian Zimmerman
*Assistant Examiner*—Yves Dalencourt
*Attorney, Agent, or Firm*—Frommer Lawrence & Haug, LLP.; William S. Frommer; Joe H. Shallenburger

[57] ABSTRACT

To make an inquiry about whether or not a predetermined command is applicable to an electronic apparatus on the controlled side with ease and in a short period of time without letting the electronic apparatus on the controlled side carry out unnecessary processing. A controlling device transmits a notify command to a controlled device. Since the notify command is applicable to the controlled device, execution of the notify command is started thereby. At the beginning of the execution of the notify command, the controlled device sends back an interim response to the controlling device, entering a state waiting for a change which is to be reported by sending back a changed response. When the controlling device receives the interim response from the controlled device, the controlling device can determine that the notify command is applicable to the controlled device, achieving the purpose of sending the notify command. For this reason, when the controlling device receives the interim response from the controlled device, the controlling device immediately transmits a notify (cancel) command to the controlled device, requesting the controlled device to cancel the notify command sent prior to the notify (cancel) command. Receiving the notify (cancel) command, the controlled device discontinues the execution of the notify command.

16 Claims, 13 Drawing Sheets

| | CTS | CT/RC | HA | OPC | OPR |
|---|---|---|---|---|---|
| FIG. 5A COMMAND TO THE CAMCORDER | "0"H | NOTIFY | VTR SUB-DEVICE | 'MECHANISM MODE' | DUMMY |
| FIG. 5B RESPONSE FROM THE CAMCORDER | "0"H | INTERIM | VTR SUB-DEVICE | 'PLAY' | '×1' |
| FIG. 5C RESPONSE FROM THE CAMCORDER | "0"H | NOT-IMPLEMENTED | VTR SUB-DEVICE | 'MECHANISM MODE' | DUMMY |
| FIG. 5D RESPONSE FROM THE CAMCORDER | "0"H | REJECTED | VTR SUB-DEVICE | 'MECHANISM MODE' | DUMMY |
| FIG. 5E COMMAND TO THE CAMCORDER | "0"H | NOTIFY | VTR SUB-DEVICE | 'MECHANISM MODE' | 'CANCEL' |
| FIG. 5F RESPONSE FROM THE CAMCORDER | "0"H | ACCEPTED | VTR SUB-DEVICE | 'MECHANISM MODE' | 'CANCEL' |

CSP : CYCLE START PACKET
ISO : ISOCHRONOUS COMMUNICATION PACKET
ASYNC : ASYNCHRONOUS COMMUNICATION PACKET

| Figure | CTS | CT/RC | HA | OPC | OPR | OPR | OPR |
|---|---|---|---|---|---|---|---|
| FIG.11A COMMAND FORMAT | "0"H | REQUEST TYPE | DESTINATION IN ELECTRONIC APPARATUS | COMMAND | PARAMETER 1 | PARAMETER 2 | PARAMETER 3 |
| FIG.11B RESPONSE FORMAT | "0"H | RESPONSE TYPE | SENDER IN ELECTRONIC APPARATUS | PROCESSED COMMAND | PARAMETER 1 | PARAMETER 2 | PARAMETER 3 |
| FIG.11C COMMAND TO THE CAMCORDER | "0"H | CONTROL | VTR SUB-DEVICE | DO 'PLAY' | 'SLOW' | | |
| FIG.11D RESPONSE FROM THE CAMCORDER | "0"H | ACCEPTED | VTR SUB-DEVICE | DO 'PLAY' | 'SLOW' | | |
| FIG.11E RESPONSE FROM THE CAMCORDER | "0"H | NOT-IMPLEMENTED | VTR SUB-DEVICE | DO 'PLAY' | 'SLOW' | | |
| FIG.11F COMMAND TO THE CAMCORDER | "0"H | INQUIRY | VTR SUB-DEVICE | DO 'PLAY' | 'SLOW' | | |
| FIG.11G RESPONSE FROM THE CAMCORDER | "0"H | IMPLEMENTED | VTR SUB-DEVICE | DO 'PLAY' | 'SLOW' | | |
| FIG.11H RESPONSE FROM THE CAMCORDER | "0"H | NOT-IMPLEMENTED | VTR SUB-DEVICE | DO 'PLAY' | 'SLOW' | | |

| | CTS | CT/RC | HA | OPC | OPR | OPR | OPR | OPR | OPR |
|---|---|---|---|---|---|---|---|---|---|
| FIG.12A COMMAND TO THE CAMCORDER | "0"H | STATUS | VTR SUB-DEVICE | TIME CODE | CURRENT VALUE | DUMMY | DUMMY | DUMMY | |
| FIG.12B RESPONSE FROM THE CAMCORDER | "0"H | STABLE | VTR SUB-DEVICE | TIME CODE | CURRENT VALUE | "0" HOURS | "25" MINUTES | "49" SECONDS | "24" FRAMES |
| FIG.12C RESPONSE FROM THE CAMCORDER | "0"H | NOT-IMPLEMENTED | VTR SUB-DEVICE | TIME CODE | CURRENT VALUE | DUMMY | DUMMY | DUMMY | |
| FIG.12D COMMAND TO THE CAMCORDER | "0"H | NOTIFY | VTR SUB-DEVICE | 'MECHANISM MODE' | DUMMY | | | | |
| FIG.12E RESPONSE FROM THE CAMCORDER | "0"H | INTERIM | VTR SUB-DEVICE | 'PLAY' | 'x 1' | | | | |
| FIG.12F RESPONSE FROM THE CAOMCORDER | "0"H | CHANGED | VTR SUB-DEVICE | 'WIND' | 'REWIND' | | | | |
| FIG.12G RESPONSE FROM THE CAMCORDER | "0"H | NOT-IMPLEMENTED | VTR SUB-DEVICE | 'MECHANISM MODE' | DUMMY | | | | |

| | CTS | CT/RC | HA | OPC | OPR |
|---|---|---|---|---|---|
| FIG. 13A COMMAND TO THE CAMCORDER | "0"H | CONTROL | VTR SUB-DEVICE | 'RESERVED' | 'RRIORITY5' |
| FIG. 13B RESPONSE FROM THE CAMCORDER | "0"H | ACCEPTED | VTR SUB-DEVICE | 'RESERVED' | 'RRIORITY5' |
| FIG. 13C COMMAND TO THE CAMCORDER | "0"H | NOTIFY | VTR SUB-DEVICE | 'RESERVED' | DUMMY |
| FIG. 13D RESPONSE FROM THE CAMCORDER | "0"H | INTERIM | VTR SUB-DEVICE | 'RESERVED' | 'RRIORITY5' |
| FIG. 13E RESPONSE FROM THE CAMCORDER | "0"H | CHANGED | VTR SUB-DEVICE | 'RESERVED' | 'RRIORITY6' |
| FIG. 13F RESPONSE FROM THE CAMCORDER | "0"H | NOT-IMPLEMENTED | VTR SUB-DEVICE | 'RESERVED' | DUMMY |

F I G. 1 4
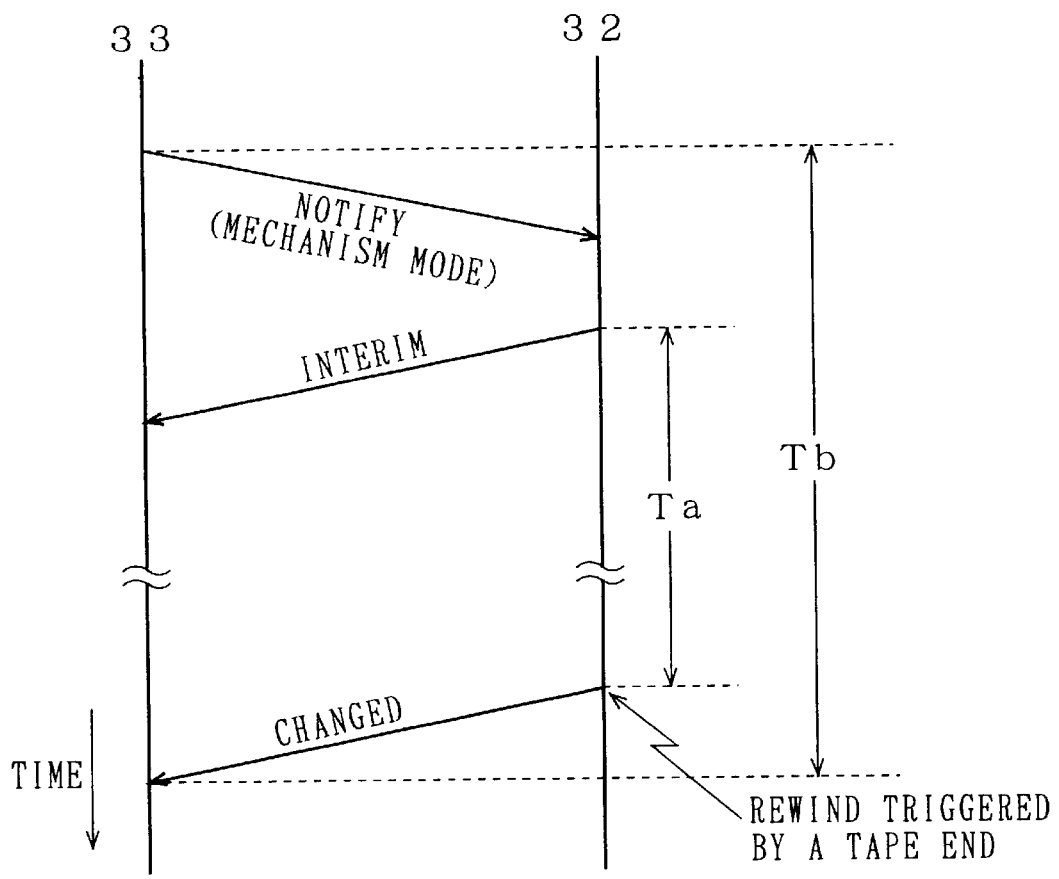

F I G. 1 5
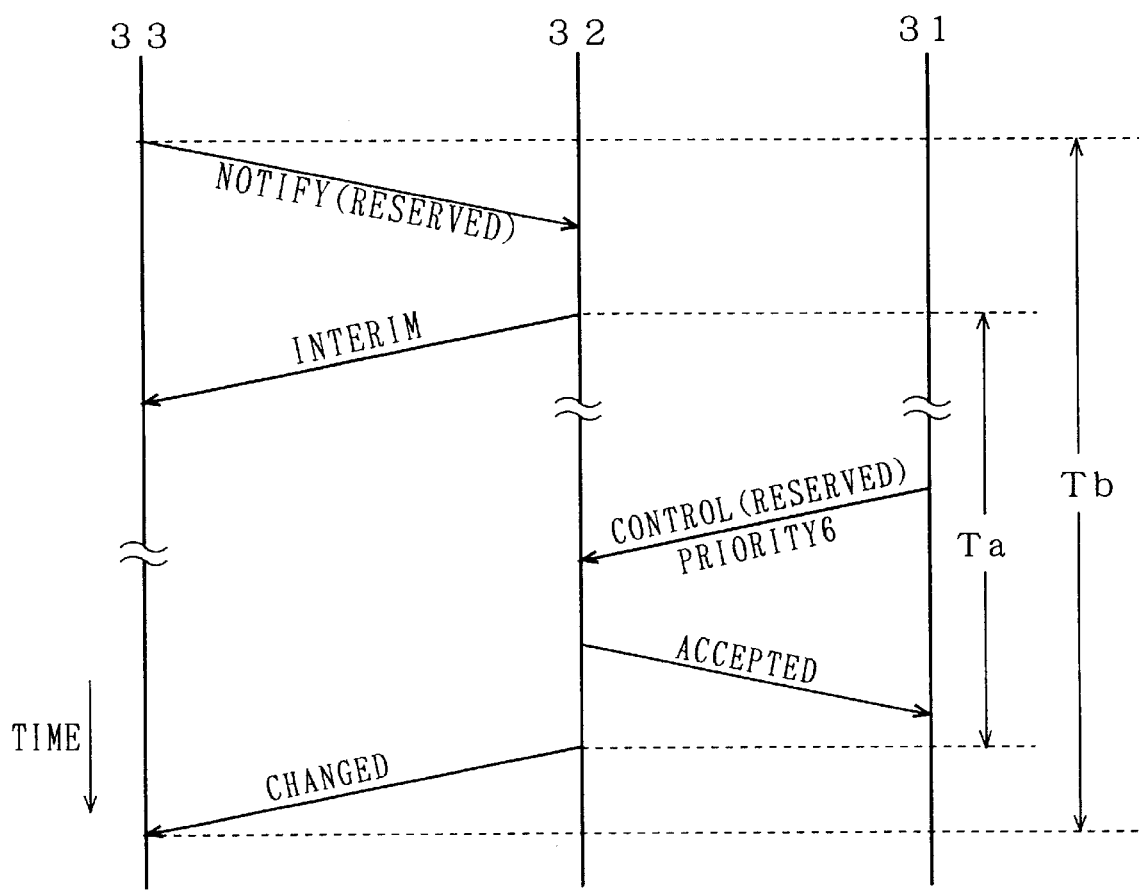

COMMUNICATION CONTROL METHOD, COMMUNICATION SYSTEM AND ELECTRONIC APPARATUS USING THE SAME

BACKGROUND OF THE INVENTION

Field of the Invention

In general, the present invention relates to a communication system, a plurality of electronic apparatuses composing the communication system, wherein the electronic apparatuses are connected to each other by communication control buses allowing control signals mixed with information signals to be transmitted such as serial buses conforming to the IEEE-1394, and a communication control method adopted in the communication system for controlling communication among the electronic apparatuses. To be more specific, the present invention relates in particular to a communication control method whereby an electronic apparatus on the controlling side supplies an electronic apparatus on the controlled side with a second command to cancel execution of a first command transmitted prior to the second command by the electronic apparatus on the controlling side to the electronic apparatus on the controlled side, requesting the electronic apparatus on the controlled side currently executing the first command to discontinue the execution of the first command so that an inquiry about whether or not the first command is applicable to the electronic apparatus on the controlled side can be made by the electronic apparatus on the controlling side to the electronic apparatus on the controlled side with ease and in a short period of time without letting the electronic apparatus on the controlled side carry out unnecessary processing.

DESCRIPTION OF THE RELATED ART

It is possible to provide a communication system for exchanging control and information signals among a plurality of electronic apparatuses composing the communication system wherein the electronic apparatuses are connected to each other by communication control buses allowing control signals mixed with information signals to be transmitted such as serial buses conforming to the IEEE-1394 each referred to hereafter as an IEEE-1394 serial bus.

FIG. 7 is a diagram showing an example of a communication system comprising a plurality of electronic apparatuses connected to each other by IEEE-1394 serial buses.

As shown in the figure, the communication system 30 comprises a video tape recorder 31 referred to hereafter simply as a VTR, an integrated-camera video tape recorder 32 referred to hereafter simply as a camcorder and a computer 33. The VTR 31 is connected to the camcorder 32 by an IEEE-1394 serial bus 34 whereas the camcorder 32 is connected to the computer 33 by an IEEE-1394 serial bus 35. Notations #A to #C are node IDs of the computer 33, the camcorder 32 and the VTR 31 in the communication system respectively.

Signals are transmitted among the electronic apparatuses of the communication system in communication cycles each having a length of typically 125 $\mu$sec on a time-division basis as shown in FIG. 8. Transmission of a signal is started by a cycle start packet (CSP) which is output to a bus by an electronic apparatus known as a cycle master to indicate the start of a communication cycle.

The form of communication performed in a communication cycle can be the so-called isochronous communication for transmitting information signals such as audio and video signals isochronously or the so-called asynchronous communication for transmitting a control signal such as a command asynchronously. To put it in detail, in a communication cycle, isochronous-communication packets of the isochronous communication are transmitted before an asynchronous-communication packet of the asynchronous communication. By assigning channel numbers 1, 2, - - - n to the isochronous-communication packets, a plurality of pieces of isochronous data can be distinguished from each other. After all isochronous-communication packets of a communication cycle are transmitted, the remaining time in the communication cycle is used for transmitting an asynchronous-communication packet till the next cycle start packet is asserted.

In asynchronous communication, a control signal used by an electronic apparatus for requesting another electronic apparatus to carry out something is called a command. An electronic apparatus which issues such a command by putting it in an asynchronous-communication packet is known as a controller. On the other hand, an electronic which receives the command is referred to as a target. If necessary, a target sends back a control signal conveying a result of the execution of a command, that is, a response, to the controller issuing the command.

A command and a response to the command are communicated between a controller and a target. The exchange of such control signals started by the transmission of a command and ended by the returning of a response to the command is known as a command transaction. A target is set to send back a response as soon as possible, typically within 100 msec after the command is received by the target. This is because a fast response prevents the controller from waiting for a response for a long time. If a controller waits for a response for a long time or a target does not send back a response due to some failures, processing will slow down.

Through a command transmitted in a command transaction, a controller can request a target to carry out a specific operation or makes an inquiry to the target about the present state of the target. Any electronic apparatus in the communication system can start and terminate a command transaction. That is to say, any electronic apparatus can serve as a controller or a target.

FIG. 9 is a diagram showing the structure of an asynchronous communication packet. The structure applies to both a command and a response. Pieces of data in the structure are transmitted in left-to-right and top-to-bottom orders. As shown in the figure, the asynchronous communication packet comprises a packet header and a data block. The entire packet header and a data CRC of the data block, a dark portion of the data block, are determined by IEEE-1394 standards. The packet header includes a destination ID, a source ID and a destination offset. The asynchronous communication packet is transmitted by an electronic apparatus identified by the source ID to an electronic apparatus identified by the destination ID where the data block of the communication packet is to be written into an address therein specified by the destination offset.

In the case of the communication system 30 shown in FIG. 7, for example, assume that the computer 33 transmits a command to the camcorder 32. In this case, the source ID is #A and the destination ID is #B. The destination offset is a memory space in the camcorder 32 allocated as an area for storing a command. When the computer 33 wants to transmit a command to all other electronic apparatuses in the communication system, 16 bits of the destination ID are set to all ones. Such transmission of a command to all other electronic apparatuses is known as broadcasting.

A CTS (Command Transaction Set) field of the data block in the structure of the asynchronous communication packet shown in FIG. 9 indicates the type of the command language. A CT/RC (Command Type/Response Code) field indicates the type of request if the packet is a command. If the packet is a response, on the other hand, the CT/RC field indicates the type of the response to the request. The HA (Header Address) field indicates whether the target is the entire electronic apparatus or a sub-device (or a functional unit) of the electronic apparatus if the packet is a command. In the case of a response, on the other hand, the HA (Header Address) field means the same thing as the command, hence merely indicating that the target specified in the command has responded. The OPC (operation) field indicates a command code, that is, a code actually describing the request made through the command. The subsequent OPR (operand) field indicates a parameter needed in the request.

FIG. 10 is a diagram showing the configuration of part of the camcorder 32, one of electronic apparatuses in the communication system, which carries out exchanges of the commands and responses described above. As shown in the figure, the camcorder 32 comprises a camcorder device 36 and an IEEE-1394-bus transceiver block 37.

Implemented by a microcomputer, the camcorder device 36 comprises a VTR sub-device 38 for carrying out, among other things, processing of commands issued to a VTR unit of the camcorder and a camera sub-device 39 for carrying out, among other things, processing of commands issued to a camera unit of the camcorder. Functions of the VTR sub-device 38 and the camera sub-device 39 are implemented by software of the microcomputer.

Detecting an asynchronous communication packet received through a bus, the IEEE-1394-bus transceiver block 37 passes on a command included in the packet to the camcorder device 36. Receiving the command, the camcorder 36 activates the VTR sub-device 38 or the camera sub-device 39 in accordance with a request specified in the command. When a play command issued to the VTR sub-device 38 is received, the play command is passed on to the VTR sub-device 38. The VTR sub-device 38 carries out processing to control the VTR unit, putting the VTR unit in a reproducing state.

Normally, the VTR sub-device 38 monitors a variety of status of the VTR unit such as the mechanism mode and the time code, creating a response to a command if necessary. The response is then transmitted by the camcorder 36 to the IEEE-1394-bus transceiver block 37. Then, the IEEE-1394-bus transceiver block 37 puts the response in an asynchronous communication packet to be finally output to the bus.

FIG. 11A is a diagram showing the format of a command and FIG. 11B is a diagram showing the format of a response. As shown in the figure, the CTS field is "0"h.

There are four types of command, namely, four kinds of command request that are defined at the present time. The first type of command is a control command for controlling the execution of a function of a target of communication. The second type of command is an inquiry command for making an in quiry about whether or not a specific control command is applicable to a target of communication. The third type of command is a status command for making an inquiry about the status of a specific function belonging to a target of communication. Finally, the fourth type of command is a notify command for making a request for a report regarding a change in status occurring in a target of communication, if any.

For example, the format of a control command requesting the VTR sub-device 38 employed in the camcorder 32 shown in FIG. 10 to carry out a slow reproducing operation is shown in FIG. 11C. The format of a typical response to this control command sent back by the VTR sub-device 38 is shown in FIG. 11D. As shown in FIG. 11D, this typical response is an accepted response which indicates that the control command received by the VTR sub-device 38 is applicable to the VTR sub-device 38 and that the request for a slow reproducing operation has been accepted. If the control command received by the VTR sub-device 38 is not applicable to the VTR sub-device 38, on the other hand, the response is a not-implemented response with the format thereof shown in FIG. 11E.

FIG. 11F is a diagram showing the format of the inquiry command which makes an inquiry about whether or not the control command requesting the VTR sub-device 38 employed in the camcorder 32 shown in FIG. 10 to carry out a slow reproducing operation is applicable to the VTR sub-device 38. The format of a typical response to this inquiry command sent back by the VTR sub-device 38 is shown in FIG. 11G. As shown in FIG. 11G, this typical response is an implemented response which indicates that the inquiry command received by the VTR sub-device 38 is applicable to the VTR sub-device 38. If the inquiry command received by the VTR sub-device 38 is not applicable to the VTR sub-device 38, on the other hand, the response is a not-implemented response with the format thereof shown in FIG. 11H.

FIG. 12A is a diagram showing the format of the status command which makes an inquiry about an hour-minute-second frame to the VTR sub-device 38 employed in the camcorder 32 shown in FIG. 10. The format of a typical response to this status command sent back by the VTR sub-device 38 is shown in FIG. 12B. As shown in FIG. 12B, this typical response is a stable response which indicates that the status command received by the VTR sub-device 38 is applicable to the VTR sub-device 38. If the status command received by the VTR sub-device 38 is not applicable to the VTR sub-device 38, on the other hand, the response is a not-implemented response with the format thereof shown in FIG. 12C.

FIG. 12D is a diagram showing the format of the notify command which requests the VTR sub-device 38 employed in the camcorder 32 shown in FIG. 10 to report a change in mechanism mode occurring in the sub-device 38, if any. The format of a typical response to this notify command sent back by the VTR sub-device 38 is shown in FIG. 12E. As shown in FIG. 12E, this typical response is an interim response which indicates that the notify command received by the VTR sub-device 38 is applicable to the VTR sub-device 38 and that the execution of the notify command is started. In the format of the interim response, the OPR and OPC fields indicate the present status of the mechanism mode. As shown in FIG. 12E, the present status of the mechanism mode is a reproducing operation at a one-time speed.

If the mechanism mode changes after the execution of the notify command is started, the VTR sub-device 38 sends back a changed response with a format shown in FIG. 12F. In the format of the changed response, the OPR and OPC fields indicate the new status of the mechanism mode. As shown in FIG. 12F, the present status of the mechanism mode is a rewind operation.

If the notify command received by the VTR sub-device 38 is not applicable to the VTR sub-device 38, on the other hand, the response is a not-implemented response with the format thereof shown in FIG. 12G.

The format of a control command issued to the VTR sub-device 38 employed in the camcorder 32 shown in FIG. 10 to make a request for a reservation at a priority of 5 is shown in FIG. 13A. It should be noted that a request for a reservation is a kind of right to control the target. The format of a typical response to this control command sent back by the VTR sub-device 38 is shown in FIG. 13B. As shown in FIG. 13B, this typical response is an accepted response which indicates that the control command received by the VTR sub-device 38 is applicable to the VTR sub-device 38 and that the request for the reservation has been accepted.

FIG. 13C is a diagram showing the format of the notify command which requests the VTR sub-device 38 employed in the camcorder 32 shown in FIG. 10 to report a change in reservation status occurring in the sub-device 38, if any. The format of a typical response to this notify command sent back by the VTR sub-device 38 is shown in FIG. 13D. As shown in FIG. 13D, this typical response is an interim response which indicates that the notify command received by the VTR sub-device 38 is applicable to the VTR sub-device 38 and that the execution of the notify format is started. In the format of the interim response, the OPR and OPC fields indicate the present status of the reservation. As shown in FIG. 13D, the present status of the reservation is 'reserved at a priority of 5'.

If the status of the reservation changes after the execution of the notify command is started, the VTR sub-device 38 sends back a changed response with a format shown in FIG. 13E. In the format of the changed response, the OPR and OPC fields indicate the new status of the reservation. As shown in FIG. 12E, the status of the reservation is now 'reserved at a priority of 6'.

If the control command received by the VTR sub-device 38 is not applicable to the VTR sub-device 38, on the other hand, the response is a not-implemented response with the format thereof shown in FIG. 13F.

By the way, in a communication system 30 in which a plurality of AV (audio-video) electronic apparatuses are connected to the computer as is the case with the communication system shown in FIG. 7, in order to implement computer-based control of the communication system, it is necessary for a device driver employed in the computer to examine functions applicable to each of the AV electronic apparatuses connected to the computer.

Therefore, before the computer issues a control command to a controlled target, in place of the control command, an inquiry command is transmitted to the controlled target to make an inquiry about whether or not the control command is applicable to the controlled target. The inquiry command transmitted to the controlled target does not change the state of the controlled target. In response to the inquiry command, the controlled target sends back an implemented response if the control command is applicable to the controlled target or a not-implemented response otherwise. In this way, the computer is capable of determining whether or not the control command is applicable to the controlled target.

Much like the inquiry command, the status command does not change the state of the controlled target to which the status command is issued. In actuality, a status command can thus be transmitted to a controlled target instead. In response to the status command, the controlled target sends back a not-implemented response if the status command is not applicable to the controlled target or a response other than a not-implemented response otherwise. By the same token, the computer is capable of determining whether or not the status command is applicable to the controlled target.

Much like the inquiry and status commands, the notify command has a property not to change the state of the controlled target to which the notify command is issued. In actuality, a notify command can thus be transmitted to a controlled target. In response to the notify command, the controlled target sends back a not-implemented response if the notify command is not applicable to the controlled target or a response other than a not-implemented response otherwise. By the same token, the computer is capable of determining whether or not the notify command is applicable to the controlled target.

In this case, however, when an interim response is sent back by the controlled target, the controlled target again sends back a changed response after an indeterminate time has lapsed. It is not until the transmission of the changed response that the communication transaction initiated by the issuance of the notify command can be regarded as completed. By the way, the changed response is sent back when there is a change in status specified by the notify command. If such a change does not occur at all, the changed response is not sent back either. In order to send back the changed response, the controlled target needs to enter a state waiting for such a change.

FIG. 14 is a diagram showing an example of an exchange of control signals in the communication system shown in FIG. 7 wherein the computer 33 transmits to the VTR sub-device 38 of the camcorder 32 a notify command, which is normally used to make a request for a report of a change in mechanism mode occurring in the camcorder 32, in order to determine whether or not this notify command is applicable to the camcorder 32. Assume that the VTR unit employed in the camcorder 32 is in a reproducing state initially.

As shown in FIG. 14, first of all, the computer 33 transmits a notify command to the camcorder 32. Since the notify command is applicable to the camcorder 32, execution of the notify command is started thereby. At the beginning of the execution of the notify command, the camcorder 32 sends back an interim response to the computer 33, entering a state waiting for a change in mechanism mode which is to be reported by sending back a changed response. Then, as an indeterminate time lapses, the end of the tape is reached. At that time, the VTR unit employed in the camcorder 32 transits from the reproducing state to the rewind state, causing the camcorder 32 to send back a changed response to the computer 33.

FIG. 15 is a diagram showing an example of an exchange of control signals in the communication system 30 shown in FIG. 7 wherein the computer 33 transmits to the VTR sub-device 38 of the camcorder 32 a notify command, which is normally used to make a request for a report of a change in reservation status occurring in the camcorder 32, in order to determine whether or not this notify command is applicable to the camcorder 32. Assume that the status of the reservation in the VTR sub-device 38 of the camcorder 32 is 'reserved at a priority of 5' initially.

As shown in FIG. 15, first of all, the computer 33 transmits a notify command to the camcorder 32. Since the notify command is applicable to the camcorder 32, execution of the notify command is started thereby. At the beginning of the execution of the notify command, the camcorder 32 sends back an interim response to the computer 33, entering a state waiting for a change in reservation status which is to be reported by sending back a changed response. Then, as an indeterminate time lapses, the VTR 31 transmits a control command to the VTR sub-device 38 of the camcorder 32, requesting a reservation at a priority of 6. Assume that, in response to this control command, the camcorder 32 sends back an accepted response to the VTR 31, notifying the VTR 31 that the request has been accepted. In this case, since the status of the reservation changes, the camcorder 32 sends back a change response to the computer 33, notifying the computer 33 that the present reservation status is 'reserved at a priority of 6'.

It should be noted that notation Ta shown in FIGS. 14 and 15 is the time the camcorder 32 takes to wait for a change which is to be reported by sending back the changed command. On the other hand, notation Tb is a communication processing time the computer 33 takes to make an inquiry to the camcorder 32 about whether or not the notify command is applicable to the camcorder 32.

As described above, in order to determine whether or not a notify command is applicable to a controlled target, the computer transmits the notify command to the controlled target. In actuality, it is possible to determine whether or not the notify command is applicable to the controlled target at a point of time an initial interim response is transmitted by the controlled target in response to the notify command. That is to say, at that point of time, the purpose of transmitting the notify command has been achieved.

However, the computer can not go on to next processing till a changed response is received from the controlled target. Assume that the computer can determine that a notify command is applicable to a controlled target without waiting for a changed response which is to be sent back by the controlled target in response to the notify command. In this case, the computer can issue a next notify command to the controlled target. Even if the computer can transmit notify commands to a controlled target one after another, the total time for waiting for changed responses to be sent back by the controlled target in response to the notify commands may exceed an upper limit commensurate with the processing power of the computer, making the processing stagnant. In addition, the controlled target also needs to enter a state, waiting for a time to transmit a changed response after an interim response is sent back. As a result, unnecessary processing must be carried out in order to execute the notify command.

SUMMARY OF THE INVENTION

It is thus an object of the present invention to provide a communication system, a plurality of electronic apparatuses composing the communication system and a communication control method adopted in the communication system whereby an electronic apparatus on the controlling side can make an inquiry to an electronic apparatus on the controlled side about whether or not a command is applicable to the electronic apparatus on the controlled side with ease and in a short period of time without letting the electronic apparatus on the controlled side carry out unnecessary processing.

According to one aspect of the present invention, there is provided a communication control method to be adopted in a communication system for transmitting control signals among a plurality of electronic apparatuses composing the communication system, the communication control method characterized in that the a first electronic apparatus on the controlling side, supplies a second electronic apparatus on the controlled side, with a second command to cancel execution of a first command transmitted prior to the second command by the first electronic apparatus to the second electronic apparatus, requesting the second electronic apparatus currently executing the first command to discontinue the execution of the first command.

According to another aspect of the present invention, there is provided a communication system for transmitting control signals among a plurality of electronic apparatuses composing the communication system wherein:
a first electronic apparatus on the controlling side, comprises first command transmitting means for transmitting a first command to a second electronic apparatus on the controlled side, and second command transmitting means for transmitting a second command to the second electronic apparatus after said first command to cancel the first command; and
the second electronic apparatus has command-execution discontinuing means for discontinuing the execution of the first command upon receiving the second command if the first command is applicable to the second electronic apparatus.

According to another aspect of the present invention, there is provided an electronic apparatus employed in a communication system for transmitting control signals among a plurality of electronic apparatuses composing the communication system, the electronic apparatus comprising first command transmitting means for transmitting a first command to an electronic apparatus on the controlled side, second command transmitting means for transmitting a second command to the electronic apparatus on the controlled side after said first command to cancel the first command and a response receiving means for receiving a response for notifying the electronic apparatus that the execution of the first command has been started from the electronic apparatus on the controlled side, wherein the second command transmitting means transmits the second command to the electronic apparatus on the controlled side when the response receiving means receives the response from the electronic apparatus on the controlled side.

According to another aspect of the present invention, there is provided an electronic apparatus employed in a communication system for transmitting control signals among a plurality of electronic apparatuses composing the communication system, the electronic apparatus having command-execution discontinuing means for discontinuing the execution of a first command upon receiving a second command after said first command if the first command is applicable to the electronic apparatus.

In such a communication system, control signals are transmitted among a plurality of electronic apparatuses composing the communication system by mixing the control signals with information signals. Typically, the electronic apparatuses are connected to each other by communication control buses capable of transmitting the mixed signals. In this way, control and information signals can be transmitted among the electronic apparatuses.

For example, assume that a controller which is the first electronic apparatus on the controlling side, transmits a first command to a target which is the second electronic apparatus on the controlled side. Let the first command be a notify command which is naturally used for requesting the second electronic apparatus to report a change in status occurring in the second electronic apparatus to the first electronic apparatus, if any. The first electronic apparatus transmits the first command to the second electronic apparatus in order to make an inquiry about whether or not the first command is applicable to the second electronic apparatus. If the first command is applicable to the second electronic apparatus, the second electronic apparatus starts the execution of the first command, sending back a response to the first electronic apparatus to notify the first electronic apparatus that the execution of the first command has been started.

Receiving the response, the first electronic apparatus transmits a second command to the second electronic apparatus, requesting the second electronic apparatus to cancel the first command. Receiving the second command, the second electronic apparatus discontinues the execution of the first command. After discontinuing the execution of the first command, the second electronic apparatus transmits another response to the first electronic apparatus, notifying the first electronic apparatus that the request conveyed by the second command to cancel the first one has been accepted.

BRIEF DESCRIPTION OF THE DRAWINGS

FIGS 5A–5F are diagrams showing examples of formats of commands and responses which are exchanged between a computer and a camcorder after the computer transmits a notify command to the camcorder, making an inquiry about whether or not the notify command is applicable to the camcorder;

FIGS 11A–11H are diagrams showing formats of commands and responses;

FIG. 12 is a diagram showing formats of commands and responses;

FIG. 13 is a diagram showing formats of commands and responses;

FIG. 14 is a diagram showing an example of operations which are carried out place when a computer transmits a notify command to a camcorder in order to request the camcorder to report a change in mechanism mode occurring in the camcorder if any; and FIG. 15 is a diagram showing an example of operations which are carried out when a computer transmits a notify command to a camcorder in order to request the camcorder to report a change in reservation status occurring in the camcorder if any.

DETAILED DESCRIPTION OF THE PREFERRED EMBODIMENT

Figure 1:
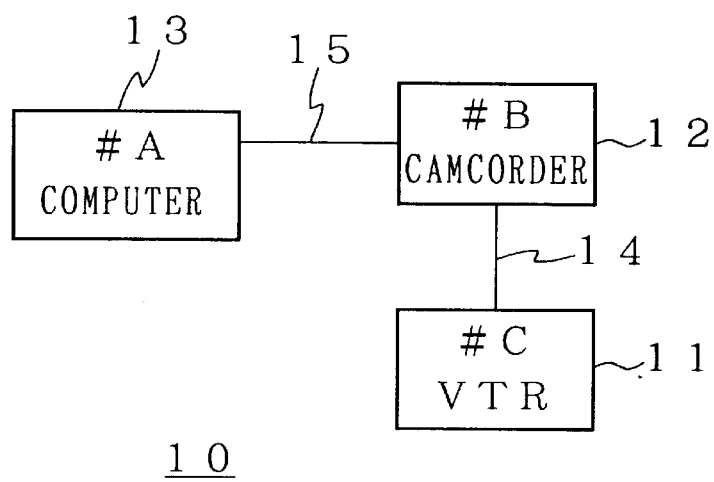
FIG. 1 is a block diagram showing a communication system as implemented by an embodiment of the present invention.

The present invention will become more apparent from a study of the following detailed description of a preferred embodiment with reference to accompanying diagrams some of which show the embodiment. FIG. 1 is a diagram showing a communication system 10 as implemented by an embodiment of the present invention. Much like the communication system 30 shown in FIG. 7, the communication system 10 also comprises a plurality of electronic apparatuses connected to each other by IEEE-1394 serial buses.

As shown in the figure, the communication system 10 comprises a VTR 11, a camcorder 12 and a computer 13. The VTR 11 is connected to the camcorder 12 by an IEEE-1394 serial bus 14 whereas the camcorder 12 is connected to the computer 13 by an IEEE-1394 serial bus 15. Notations #A to #C are node IDs of the computer 13, the camcorder 12 and the VTR 11 in the communication system respectively.

Figure 7:
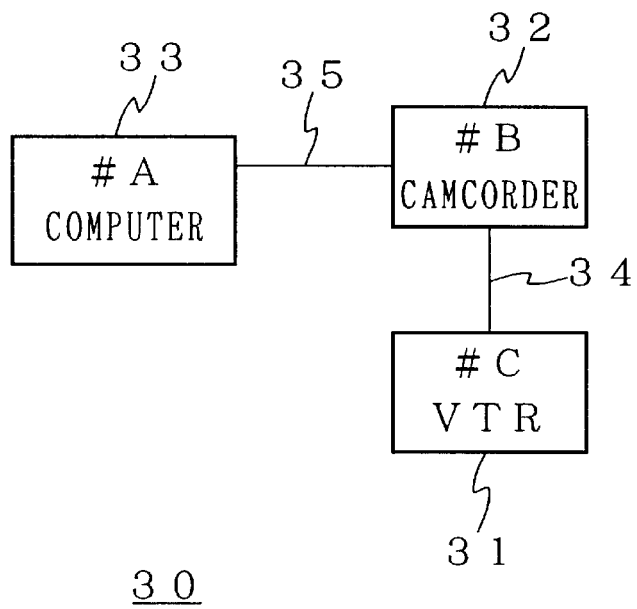
FIG. 7 is a diagram showing an example of a communication system comprising a plurality of electronic apparatuses connected to each other by IEEE-1394 serial buses.
Figure 8:
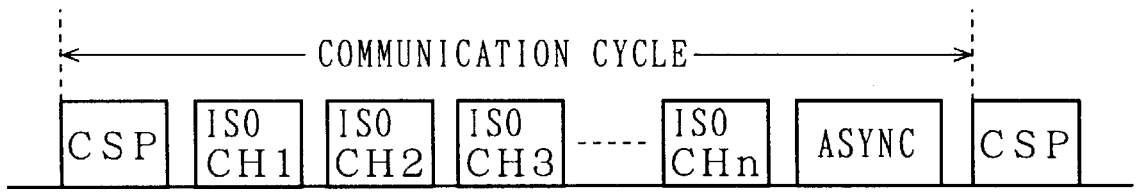
FIG. 8 is a diagram showing an example of the structure of data on an IEEE-1394 serial bus used in a communication system.
Figure 9:
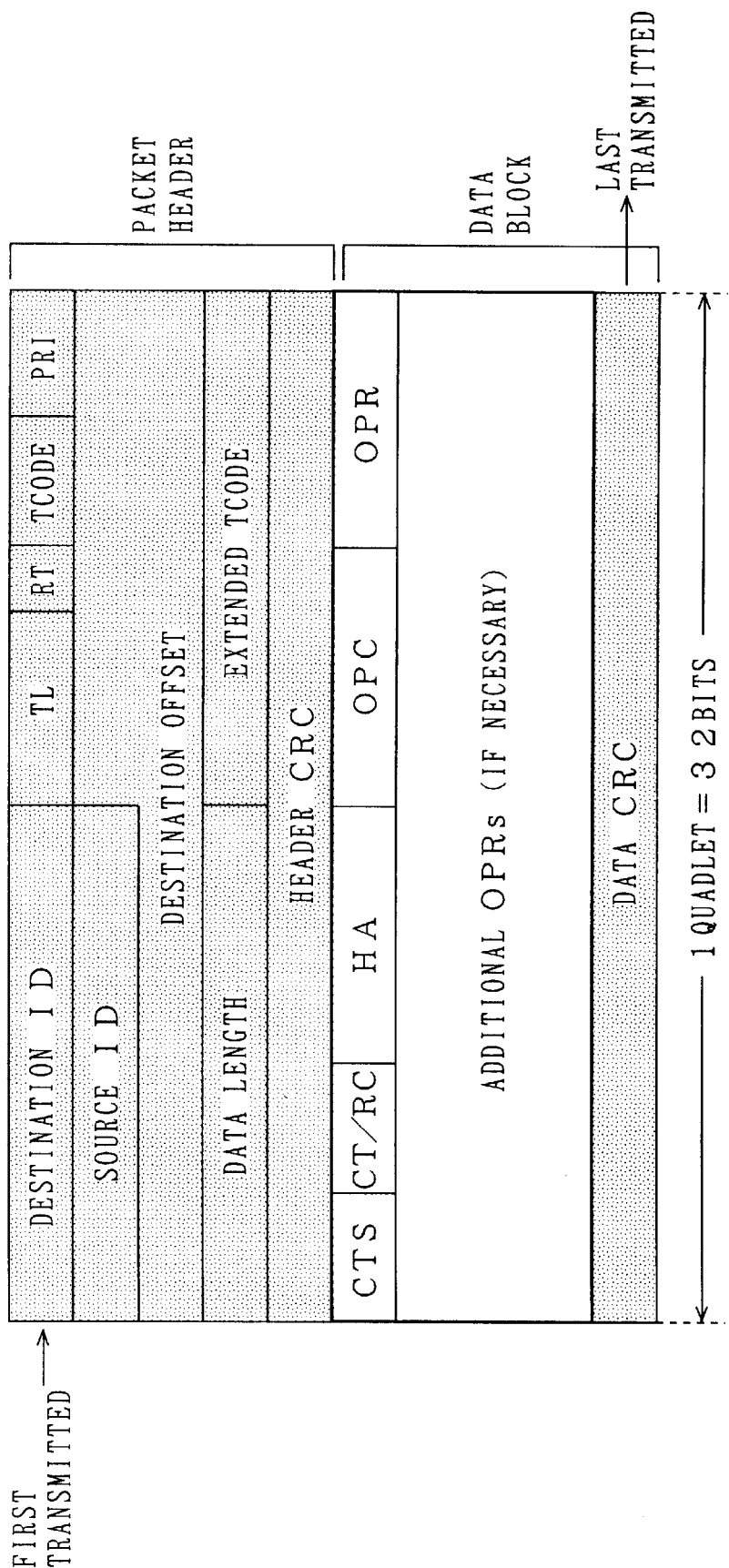
FIG. 9 is a diagram showing the structure of an asynchronous communication packet.
Figure 10:
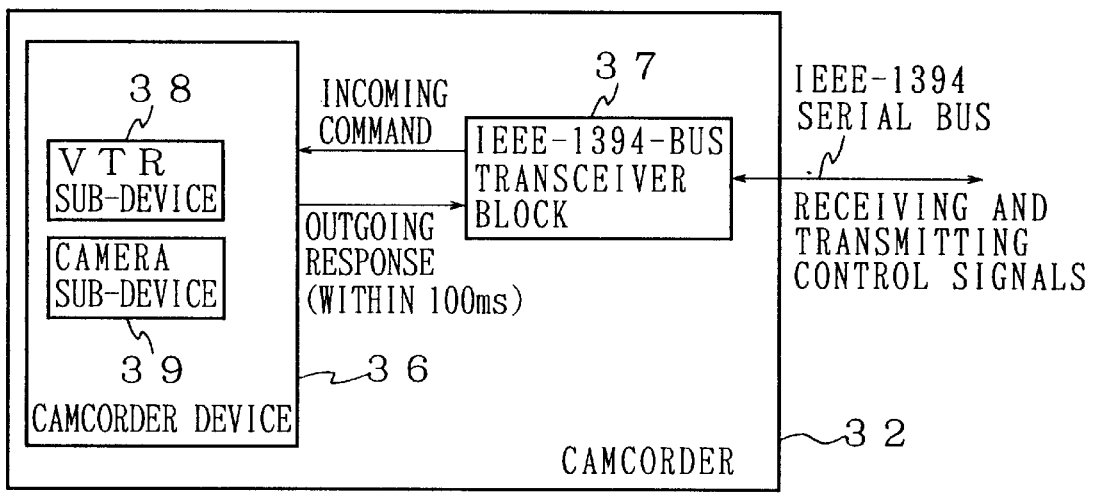
FIG. 10 is a diagram showing the configuration of part of a camcorder employed in the communication system using IEEE-1394 serial buses for carrying out exchanges of commands and responses.

Much like the communication system 30 shown in FIG. 7, signals are transmitted among the electronic apparatuses of the communication system in communication cycles on a time-division basis as shown in FIG. 8. As shown in the figure, information signals such as audio and video data are transmitted by isochronous communication packets while control signals such as commands are transmitted in asynchronous communication packets. When an electronic apparatus on the controlling target also referred to as a controller makes a request for something to an electronic apparatus on the controlled side also known as a target, the controller puts a command in an asynchronous communication packet, transmitting the packet to the target. As described earlier, the structure of an asynchronous communication packet is shown in FIG. 9 whereas the format of a command is shown in FIG. 11A. Then, if necessary, the target puts a response indicating a result of the execution of the command in an asynchronous communication packet, transmitting the packet to the controller. The format of a response is shown in FIG. 11B as described before.

Figure 2:
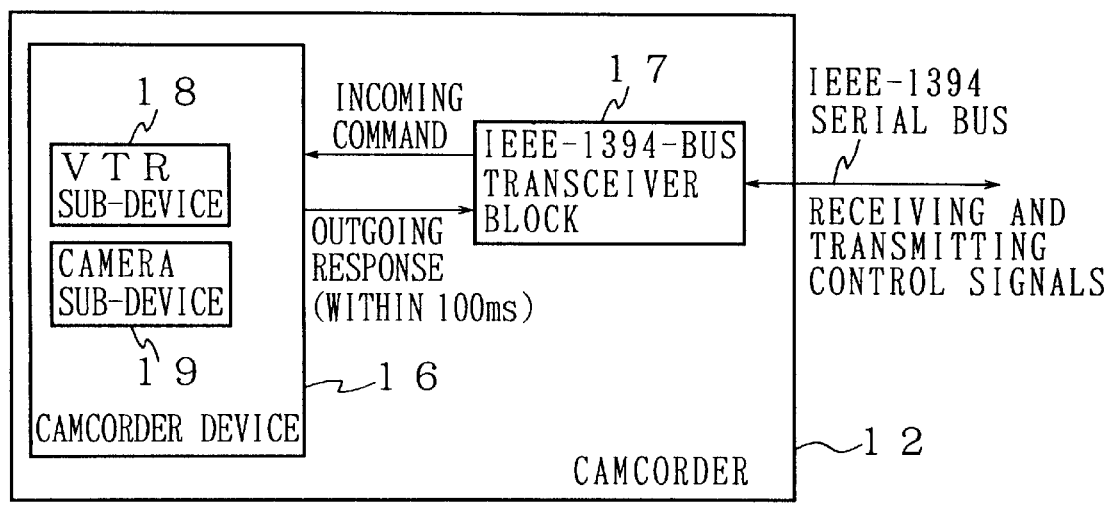
FIG. 2 is a diagram showing the configuration of part of a camcorder employed in the communication system implemented by the embodiment shown in FIG. 1 for carrying out exchanges of commands and responses.

FIG. 2 is a diagram showing the configuration of part of the camcorder 12, one of electronic apparatuses in the communication system, which carries out exchanges of the commands and responses described above. As shown in the figure, the camcorder 12 comprises a camcorder device 16 and an IEEE-1394-bus transceiver block 17 much like the camcorder 32 employed in the communication system 30 shown in FIG. 7.

Implemented by a microcomputer, the camcorder device 16 comprises a VTR sub-device 18 for carrying out, among other things, processing of commands issued to a VTR unit of the camcorder and a camera sub-device 19 for carrying out, among other things, processing of commands issued to a camera unit of the camcorder. Functions of the VTR sub-device 18 and the camera sub-device 19 are implemented by software of the microcomputer.

Detecting an asynchronous communication packet received through a bus, the IEEE-1394-bus transceiver block 17 passes on a command included in the packet to the camcorder device 16. Receiving the command, the camcorder 16 activates the VTR sub-device 18 or the camera sub-device 19 in accordance with a request specified by the command.

Normally, the VTR sub-device 18 and the camera sub-device 19 monitor a variety of status of the VTR unit and the camera unit respectively, creating a response to the command if necessary. The response is then transmitted through the camcorder 16 to the IEEE-1394-bus transceiver block 17. Then, the IEEE-1394-bus transceiver block 17 puts the response in an asynchronous communication packet to be finally output to the bus.

In the present embodiment, when a controller, an electronic apparatus on the controlling side, makes an inquiry about whether or not a notify command is applicable to a target, an electronic apparatus on the controlled side, the controller carries out the following operations. First of all, the controller transmits a notify command to the target. Then, when an interim response is received from the target, the controller transmits a cancel command to the target, requesting the target to discontinue the execution of the notify command.

Figure 3:
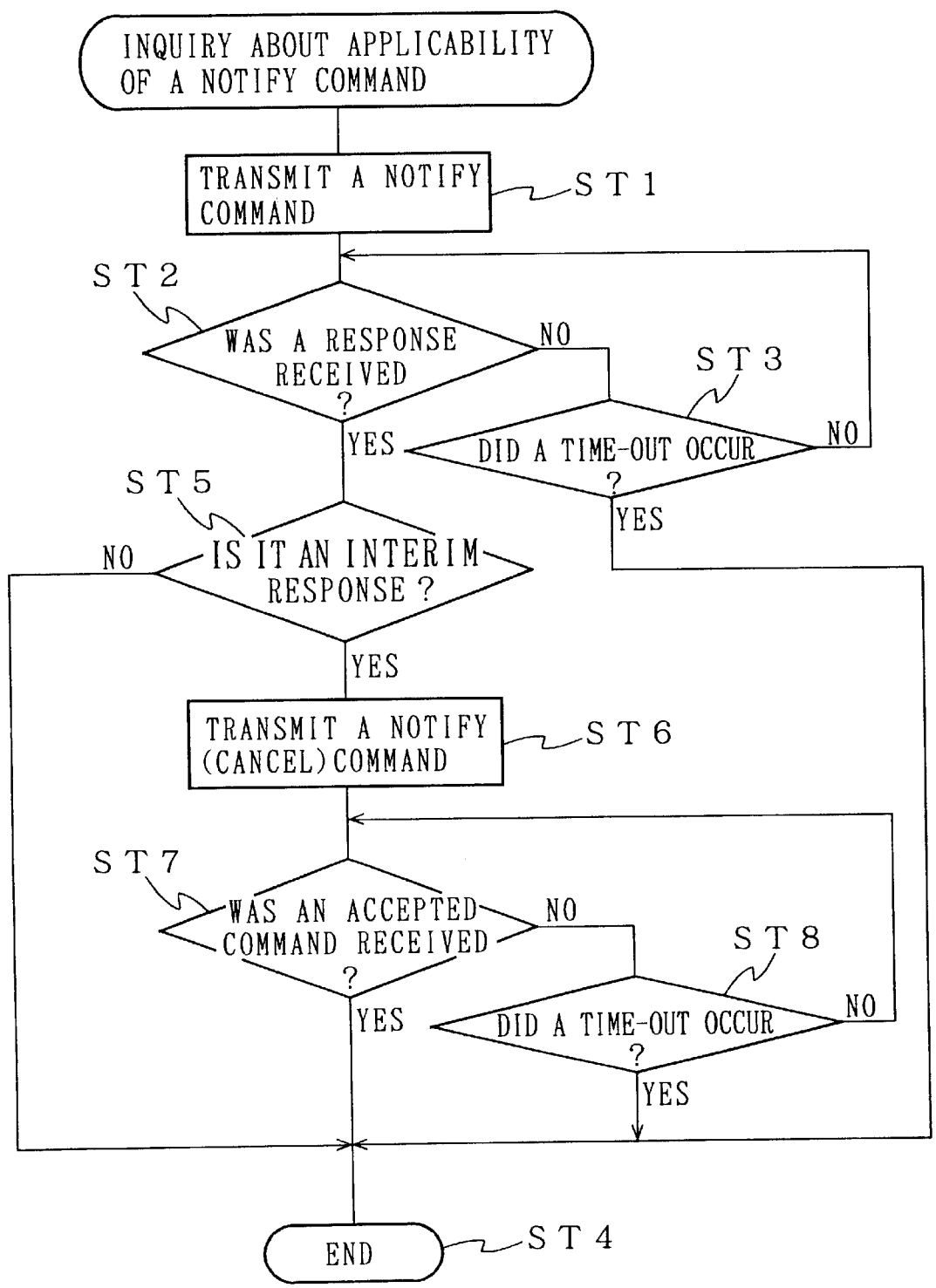
FIG. 3 is a schematic flow diagram showing a sequence of operations carried out by a controller, an electronic apparatus on the controlling side, when making an inquiry about whether or not a notify command is applicable to a target, an electronic apparatus on the controlled side.

FIG. 3 is a schematic flow diagram showing a sequence of operations carried out by the controller when making an inquiry about whether or not a notify command is applicable to the target.

As shown in the figure, the flowchart begins with a step ST1 at which a notify command is transmitted by the controller to the target. The operational flow then goes on to a step ST2 at which the controller finds out whether or not a response has been received from the target. If no response has been received from the target, the operational flow proceeds to a step ST3 at which the controller determines whether or not a time-out has occurred, that is, whether or not a time of typically 100 msec has lapsed since the issuance of the notify command. If a time-out has not occurred yet, the operational flow returns to the step ST2 at which the controller finds out whether or not a response has been received from the target again. If a time-out has occurred, on the other hand, the operational flow continues to a step ST4 at which the controller ends the inquiry operation.

If a response is found received at the step ST2, on the other hand, the operational flow goes on to a step ST5 at which the controller examines the response to find out whether or not the response is an interim response. If the response is not an interim response, the operational flow goes on to the step ST4 at which the inquiry operation is terminated. If the response is found out to be an interim response, on the other hand, the operational flow proceeds to a step ST6 at which the controller transmits a notify (cancel) command.

The notify (cancel) command is a kind of notify command to request the target to discontinue the execution of the previous notify command. Typically, a notify (cancel) command is formed by replacing 'dummy' in the OPR field in the format of a notify command by 'cancel'.

The operational flow then goes on to a step ST7 at which the controller finds out as to whether or not an accepted response has been received from the target. If no accepted response has been received from the target, the operational flow proceeds to a step ST8 at which the controller determines whether or not a time-out has occurred, that is, whether or not a time of typically 100 msec has lapsed since the issuance of the notify (cancel) command. If a time-out has not occurred yet, the operational flow returns to the step ST7 at which the controller finds out whether or not a response has been received from the target again. If the controller finds out that a time-out has occurred at the step ST8 or if an accepted response is found received at the step ST7, on the other hand, the operational flow continues to the step ST4 at which the controller ends the inquiry operation.

Figure 4:
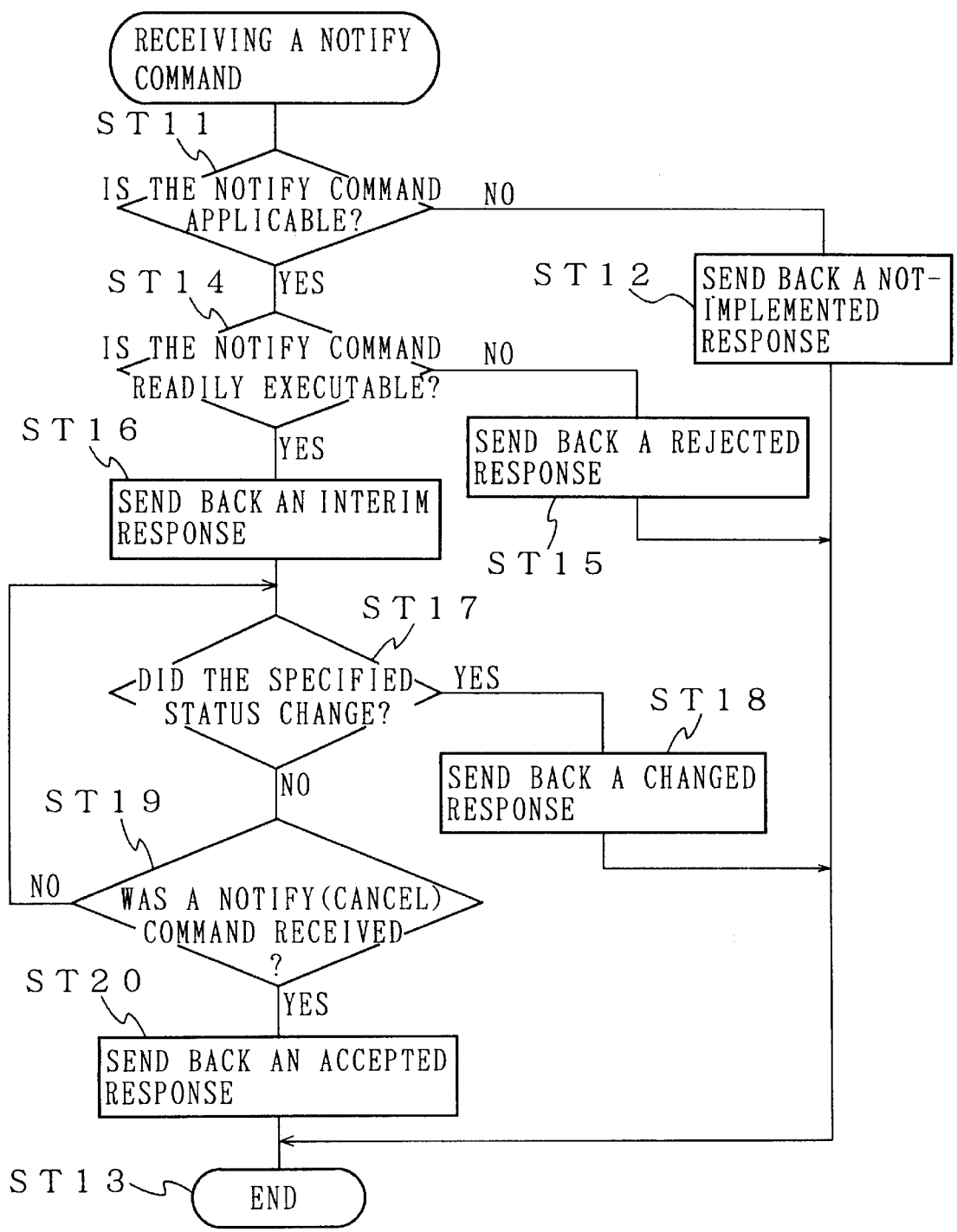
FIG. 4 is a schematic flow diagram showing operations carried out by a target, an electronic apparatus on the controlled side, to send back a response when receiving a notify command.

In the present embodiment, receiving a notify command, the target carries out operations to send back a response in accordance with a procedure represented by a flowchart shown in FIG. 4.

As shown in the figure, the flowchart begins with a step ST11 at which whether or not the notify command is applicable to the target is determined. If the notify command is not applicable, the operational flow goes on to a step ST12 at which the target sends back a not-implemented response to the controller. The operational flow then proceeds to a step ST13 at which the target ends the operation to process the notify command.

If the notify command is found applicable to the target at the step ST11, on the other hand, the operational flow continues to a step ST14 at which whether or not the notify command can be executed now is determined. If the notify command can not be executed now, the operational flow goes on to a step ST15 at which the target sends back a rejected response to the controller. The operational flow then proceeds to the step ST13 at which the target ends the operation to process the notify command.

If the notify command is found executable now at the step ST14, on the other hand, the operational flow goes on to a step ST16 at which the target sends back an interim response. In this case, the target starts the execution of the notify command, entering a state waiting for a time to send back a changed command.

The operational flow then proceeds to a step ST17 at which whether or not a status specified in the notify command has changed is determined. Examples of the status are the mechanism mode and the status of the reservation. If the status has changed, the operational flow continues to a step ST18 at which the target sends back a changed response to the controller. The operational flow then proceeds to the step ST13 at which the target ends the operation to process the notify command.

If the status specified in the notify command is found unchanged at the step ST17, on the other hand, the operational flow goes on to a step ST19 at which the target finds out whether a notify (cancel) command has been received from the controller to cancel the notify command transmitted prior to the notify (cancel) command by the controller. If a notify (cancel) command has not been received, the operational flow returns to the step ST17 at which whether the status specified in the notify command has changed is determined.

If a notify (cancel) command is found received at the step ST19, the operational flow goes on to a step ST20 at which the target sends back an accepted response to the controller to notify the controller that the request specified in the notify (cancel) command has been accepted. The operational flow then returns to the step ST13 at which the target ends the operation to process the notify command. In this case, the target discontinues the execution of notify command, exiting the state waiting for a time to send back a changed response.

Assume that, in the communication system 10 shown in FIG. 1, the computer 13 transmits a notify command, which is normally used for requesting a target to report a change in mechanism mode occurring in the target, to the VTR sub-device 18 of the camcorder 12 to find out whether or not the notify command is applicable to the VTR sub-device 18 of the camcorder 12.

The format of the notify command from the computer 13 described above is shown in FIG. 5A. The format of a response sent back by the VTR sub-device 18 of the camcorder 12 to the computer 13 in response to the notify format is explained as follows. If the notify command is not applicable to the VTR sub-device 18 of the camcorder 12, a not-implemented response with a format shown in FIG. 5C is sent back. If the notify command is applicable to the VTR sub-device 18 of the camcorder 12 but can not be executed now, on the other hand, a rejected response with a format shown in FIG. 5D is sent back. If the notify command is applicable to the VTR sub-device 18 of the camcorder 12 and can be executed now, execution of the notify command is started and an interim response with a format shown in FIG. 5B is sent back.

FIG. 5E shows the format of a notify (cancel) command which is transmitted by the computer 13 to the VTR sub-device 18 of the camcorder 12 when the interim response transmitted by the VTR sub-device 18 of the camcorder 12 is received by the computer 13. As shown in FIG. 5E, the OPR field of the notify command is changed from 'dummy' to typically 'cancel'. FIG. 5F shows the format of the accepted response transmitted by the VTR sub-device 18 of the camcorder 12 to the computer 13 in response to the notify (cancel) command.

Figure 6:
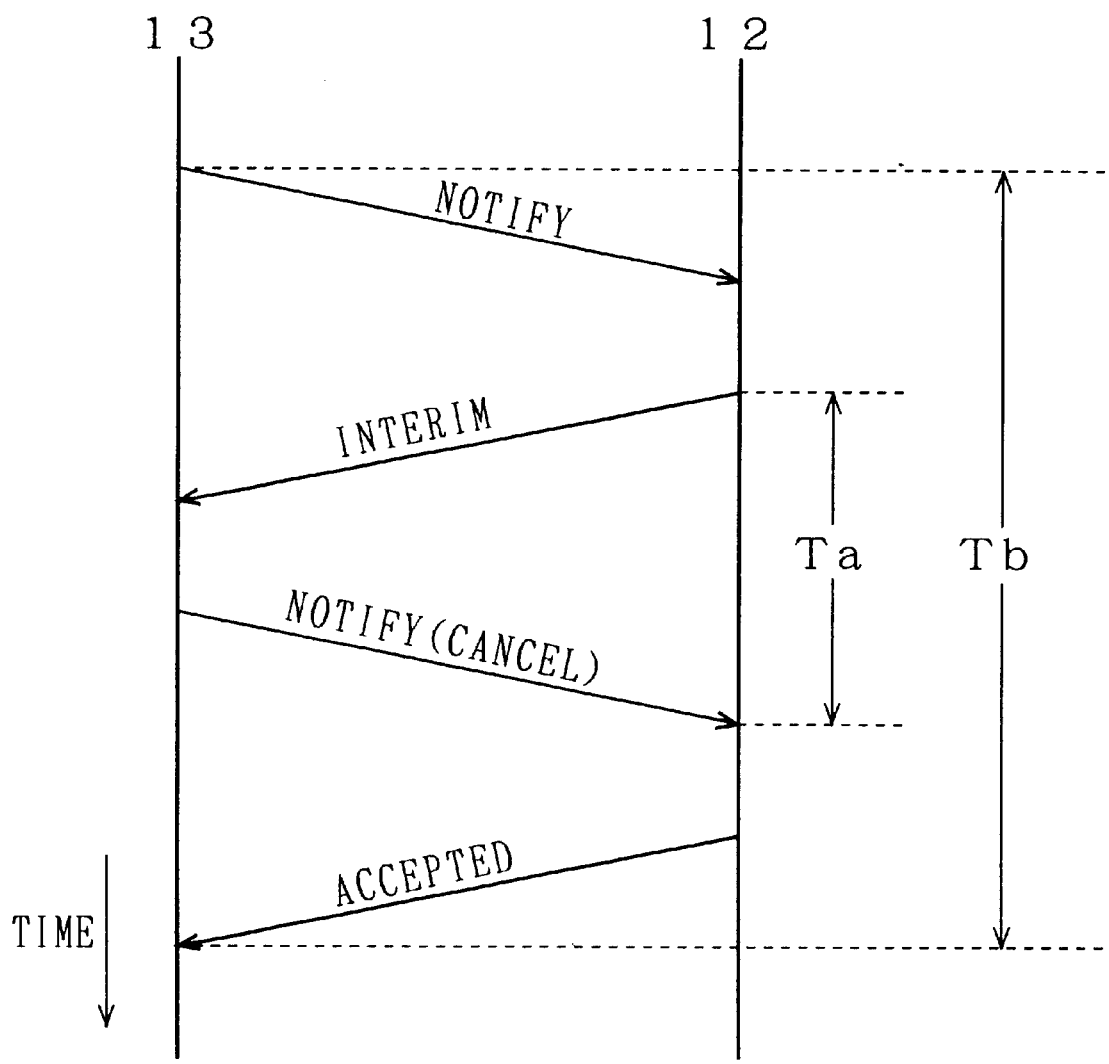
FIG. 6 is a diagram showing an example of operations which are carried out when a computer transmits a notify command to a camcorder in order to make an inquiry about whether or not this notify command is applicable to the camcorder.

FIG. 6 is a diagram showing an example of exchanges of control signals in the communication system 10 shown in FIG. 1 wherein the computer 13 transmits a notify command to the camcorder 12 in order to make an inquiry about whether or not this notify command is applicable to the camcorder 12.

First, the computer 13 sends a notify command to the camcorder 12. Since the notify command is applicable to the camcorder 12, execution of the notify command is started thereby. At the beginning of the execution of the notify command, the camcorder 12 sends back an interim response to the computer 13, entering a state waiting for a change which is to be reported by sending back a changed response. When the computer 13 receives the interim response from the camcorder 12, the computer 13 can actually determine that the notify command is applicable to the camcorder 12, achieving the purpose of sending the notify command.

For this reason, when the computer 13 receives the interim response from the camcorder 12, the computer 13 immediately transmits a notify (cancel) command to the camcorder 12 to cancel the notify command sent prior to the notify (cancel) command. Receiving the notify (cancel) command, the camcorder 12 discontinues the execution of the notify command, exiting the state waiting for a change which is to be reported by sending back a changed response. At the same time, the camcorder transmits an accepted response to the computer 13 to notify the computer 13 that the request conveyed in the notify (cancel) command has been accepted. Receiving the accepted response, the computer 13 terminates the inquiry operation.

It should be noted that notation Ta shown in FIG. 6 is the time the camcorder 12 takes to wait for a change which is to be reported by sending back the changed command. Notation Tb is a communication processing time the computer 13 takes to make an inquiry to the camcorder 12 about whether or not the notify command is applicable to the camcorder 12.

As described above, in the present embodiment, when a controller such as the computer 13, an electronic apparatus on the controlling side, makes an inquiry about whether or not a notify command is applicable to a target such as the camcorder 12 or the VTR 11, an electronic apparatus on the controlled side, the controller carries out the following operations. First of all, the controller transmits a notify command to the target. Then, when the controller receives an interim response from the target, achieving the purpose of sending the notify command, the controller transmits a notify (cancel) command to the target in order to request the target that the execution of the notify command be discontinued.

In this way, the controller can make an inquiry to the target about whether or not a notify command is applicable to the target in a simple way and in a short period of time without letting the target carry out unnecessary processing. In addition, an inquiry command for making an inquiry about whether or not a notify command is applicable to a target is not a new type of control command, giving rise to a merit that it is not necessary to define a new type of control command.

As described above, the present embodiment implements a communication system 10 comprising a computer 13, camcorders 12 and VTRs 11 connected to each other by IEEE-1394 serial buses. In the present embodiment, the controller transmits a notify (cancel) command to a target in order to cancel the execution of a notify target transmitted by the controller to the target prior to the notify (cancel) command. It should be noted, however, that the description is not intended to be construed in a limiting sense. That is to say, it is to be understood that the subject matter encompassed by the present invention is not limited to such a system. For example, the present invention can also be applied to other systems for transmitting control signals among a plurality of electronic apparatuses. In addition, a command whose execution is canceled in a target is not limited to a notify command. The controller can also request the cancellation of another command such as a command whereby the associated communication transaction can not be completed even at a point of time desired information has been obtained.

According to the present invention, an electronic apparatus on the controlling side can supply an electronic apparatus on the controlled side with a second command to cancel execution of a first command transmitted prior to the second command by the electronic apparatus on the controlling side to the electronic apparatus on the controlled side, requesting the electronic apparatus on the controlled side currently executing the first command to discontinue the execution of the first command. As a result, when the first command is transmitted by the electronic apparatus on the controlling side to the electronic apparatus on the controlled side to make an inquiry about whether or not the first command is applicable to the electronic apparatus on the controlled side, the inquiry can be made by the electronic apparatus on the controlling side with ease and in a short period of time without letting the electronic apparatus on the controlled side carry out unnecessary processing if the second command is transmitted by the electronic apparatus on the controlling side to the electronic apparatus on the controlled side at a point of time desired information from the electronic apparatus on the controlled side is obtained by the electronic apparatus on the controlling side.

What is claimed is:

1. A communication control method in a system for transmitting control signals among a plurality of electronic apparatuses, said communication control method comprising:

supplying a first command from a first electronic apparatus which is an electronic apparatus on a controlling side, to a second electronic apparatus which is an electronic apparatus on a controlled side;

supplying an interim response from said second electronic apparatus to said first apparatus; and supplying in response to receiving said interim response, a second command to cancel execution of said first command transmitted prior to said second command by said first electronic apparatus to said second electronic apparatus, said second command requesting said second electronic apparatus that is currently executing but has not finished executing said first command to discontinue said execution of said first command.

2. A communication control method according to claim 1 wherein, said first command is an inquiry to said second electronic apparatus about whether or not said first command is applicable to said second electronic apparatus; and as said second electronic apparatus starts execution of said first command, said first electronic apparatus transmits said second command to said electronic apparatus.

3. A communication control method according to claim 1 wherein:

said electronic apparatuses are connected to each other by communication control buses each capable of transmitting control signals mixed with information signals; and said first command is a notify command for requesting said second electronic apparatus to report a change in state occurring in said second electronic apparatus, if any.

4. A communication control method according to claim 3 wherein, when said first electronic apparatus makes an inquiry to said second electronic apparatus about whether or not said notify command is applicable to said second electronic apparatus, said first electronic apparatus transmits said notify command to said second electronic apparatus; and as said second electronic apparatus starts execution of said notify command, said first electronic apparatus transmits said second command to said second electronic apparatus.

5. A communication control method according to claim 3 wherein said second command is defined as a version of said notify command.

6. A communication system for transmitting control signals among a plurality of electronic apparatuses comprising:

a first electronic apparatus which is an electronic apparatus on a controlling side, said first electronic apparatus including a first command transmitting means for transmitting a first command to a second electronic apparatus which is an electronic apparatus on a controlled side, and second command transmitting means for transmitting a second command to said second electronic apparatus, after said first command, to cancel said first command;

an interim transmitting means for transmitting an interim response from said second electronic apparatus to said first apparatus to initiate said second command; and said second electronic apparatus including command-execution discontinuing means for discontinuing execution of said first command even though said first command was not completed upon receiving said second command if said first command is applicable to said second electronic apparatus.

7. A communication system according to claim 6 wherein, when said first electronic apparatus makes an inquiry to said second electronic apparatus about whether or not said first command is applicable to said second electronic apparatus, said first command transmitting means transmits said first command to said second electronic apparatus; and as said second electronic apparatus starts execution of said first command, said second command transmitting means transmits said second command to said second electronic apparatus.

8. A communication system according to claim 6 wherein:

said electronic apparatuses are connected to each other by communication control buses each capable of transmitting control signals mixed with information signals; and said first command is a notify command for requesting said second electronic apparatus to report a change in state occurring in said second electronic apparatus, if any.

9. A communication system according to claim 8 wherein, when said first electronic apparatus makes an inquiry to said second electronic apparatus about whether or not said notify command is applicable to said second electronic apparatus, said first command transmitting means transmits said notify command to said second electronic apparatus; and as said second electronic apparatus starts execution of said notify command, said second command transmitting means transmits said second command to said second electronic apparatus.

10. An electronic apparatus employed in a communication system for transmitting control signals among a plurality of electronic apparatuses comprising:

first command transmitting means for transmitting a first command to an electronic apparatus on a controlled side;

an interim response receiving means for receiving an interim command from said electronic apparatus on said controlled side; and second command transmitting means for transmitting a second command after said first command and in response to receiving said interim response, to said electronic apparatus on said controlled side to cancel said first command, while said electronic apparatus on said controlled side is executing said first command but has not finished executing said first command.

11. An electronic apparatus according to claim 10 wherein:

said electronic apparatus further comprises a response receiving means for receiving a response from said electronic apparatus on said controlled side for notifying that execution of said first command has been started; and when said response receiving means receives said response, said second command transmitting means transmits said second command to said electronic apparatus on said controlled side.

12. An electronic apparatus according to claim 10 wherein:

said electronic apparatuses are connected to each other by communication control buses each capable of transmitting control signals mixed with information signals; and said first command is a notify command for requesting said electronic apparatus to report a change in state occurring in said second electronic apparatus, if any.

13. An electronic apparatus according to claim 12 wherein:

said electronic apparatus further has response receiving means for receiving a response from said electronic apparatus on said controlled side for notifying that execution of said notify command has been started; and when said response receiving means receives said response, said second command transmitting means transmits said second command to said electronic apparatus on said controlled side.

14. An electronic apparatus employed in a communication system for transmitting control signals among a plurality of electronic apparatuses comprising command-execution discontinuing means for discontinuing execution of a first command after sending an interim response upon receiving a second command after said first command and in response to receiving said interim response, if said first command is applicable to said electronic apparatus.

15. An electronic apparatus according to claim 14 wherein:

said electronic apparatuses are connected to each other by communication control buses each capable of transmitting control signals mixed with information signals; and said first command is a notify command for requesting said electronic apparatus to report a change in state occurring in said electronic apparatus, if any.

16. An electronic apparatus according to claim 10 wherein:

said electronic apparatuses are connected to each other by communication control buses each confirming to the IEEE-1394 standard.

* * * * *